United States Patent [19]

Task et al.

[11] 4,299,451
[45] Nov. 10, 1981

[54] MINIMUM RESOLVABLE CONTRAST MEASUREMENT DEVICE

[75] Inventors: Harry L. Task, Montgomery County; Gilbert G. Kuperman, Green County, both of Ohio

[73] Assignee: The United States of America as represented by the Secretary of the Air Force, Washington, D.C.

[21] Appl. No.: 144,465

[22] Filed: Apr. 15, 1980

[51] Int. Cl.³ .......................... G02B 27/18; G02F 1/01; G03B 27/72; G03B 21/00
[52] U.S. Cl. ...................................... 350/407; 353/20; 353/85; 355/37; 355/69; 355/71
[58] Field of Search ................ 350/370, 407; 356/364; 353/20, 85; 355/37, 69, 71; 250/225; 214 B, 214 C

[56] References Cited

U.S. PATENT DOCUMENTS

| | | | |
|---|---|---|---|
| 3,498,705 | 3/1970 | Ooue et al. | 353/20 |
| 3,679,306 | 7/1972 | Du Bois et al. | 355/79 |
| 3,873,199 | 3/1975 | Weinert | 355/71 |
| 3,885,866 | 5/1975 | Stearns | 353/85 |
| 3,926,520 | 12/1975 | Kaufman | 250/225 |
| 4,167,024 | 9/1979 | Hamisch | 250/225 |

FOREIGN PATENT DOCUMENTS 615916 7/1978 U.S.S.R. ................. 356/364

OTHER PUBLICATIONS

Kelly, D. H. "Visual Signal Generator" Rev. Sci. Instru. vol. 32, #1, 1-1961, pp. 50-55.

Primary Examiner—William H. Punter
Attorney, Agent, or Firm—Donald J. Singer; Casimer K. Salys

[57] ABSTRACT

An apparatus for creating images of nonperiodic patterns, which patterns are variable in contrast with respect to a uniform and constant level of background luminance. Two beams of uniform luminance are projected through individual, orthogonally oriented linear polarizers, and then into a common cube beam splitter to be divided and interlaced. One combined output beam from the splitter is projected through a rotatable linear polarizer onto the image sensing optical detector undergoing test. The second beam is projected toward a detection system. The patterned region of the second beam passes through a second rotatable linear polarizer, synchronized to the first rotatable polarizer, and onto a CCD array detector system. Contrast between the pattern and the background is represented by the two electrical voltage levels in the array output, irrespective of the spatial frequencies in the pattern. Two unpatterned background regions from either of the interlaced beams are projected through individual and orthogonal linears polarizers to individual luminance detectors. Each detector, in turn, regulates its corresponding beam intensity to compensate for drift in the beam generating elements.

2 Claims, 5 Drawing Figures

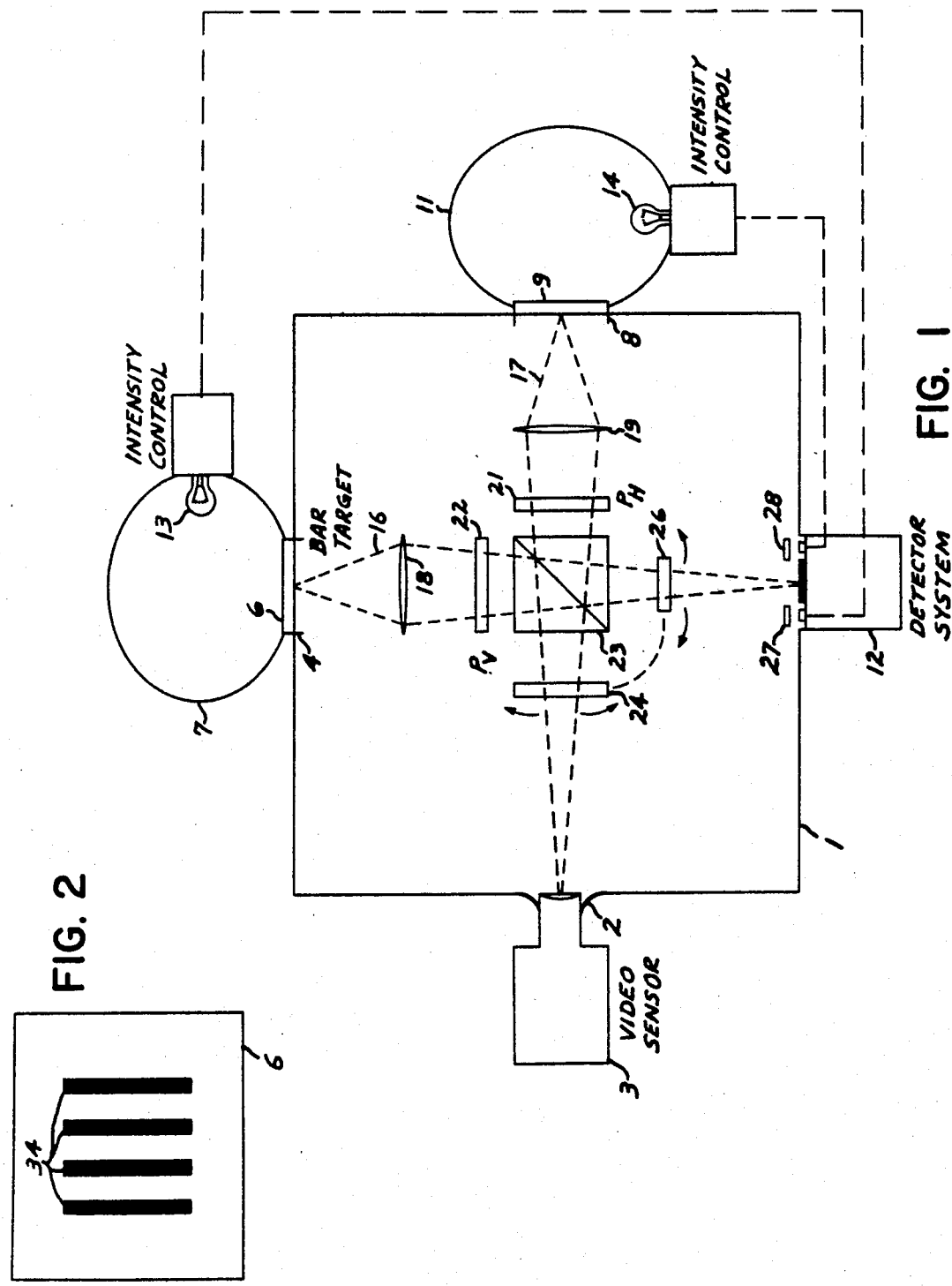

MINIMUM RESOLVABLE CONTRAST MEASUREMENT DEVICE

RIGHTS OF THE GOVERNMENT

The invention described herein may be manufactured and used by or for the Government of the United States for all governmental purposes without the payment of any royalty.

CROSS-REFERENCES TO RELATED APPLICATIONS

This invention relates to copending patent application, Ser. No. 109,592, filed on Jan. 4, 1980, common as to the inventors and the assignee and now abandoned.

BRIEF SUMMARY

The invention disclosed herein is directed to an apparatus for detecting the minimum contrast resolution of a video sensor or the like, alone or in conjunction with a human observer, through generating optical images having backgrounds of uniform and constant luminance with a variable contrast pattern superimposed thereon. Two controllable intensity beams of uniform luminance are projected to a focus at the image plane. One of the beams contains a partly opaque pattern. Each beam passes through a linear polarizer, which polarizers are orthogonally oriented relative to each other, and then through a common beam splitter where the beams are interlaced.

After beam splitting and interlacing, one of the two output beams formed is projected through a rotatable linear polarizer and onto the video sensor at the image plane. The second split and interlaced beam is projected through a synchronized, rotatable linear polarizer, and then onto a detector assembly for measuring both background intensity and pattern contrast levels. Variations in the background intensity are sensed in the detector assembly, decoupled according to polarization and apportioned according to polarization as feedback signals to correct for drift in each of the two beam sources.

Rotation of the polarizer in the optical path leading to the video sensor changes the photometric luminance of the nonperiodic pattern without altering the background luminance level. Stated otherwise, the contrast of the pattern image is varied while retaining a constant and uniform background luminance.

DESCRIPTION OF THE DRAWINGS

FIG. 1 schematically depicts a system for testing the resolvable contrast capability of a video sensor, alone or in conjunction with a human observer.

FIG. 2 shows conventional four-bar target transparency.

DETAILED DESCRIPTION

Figure 3:
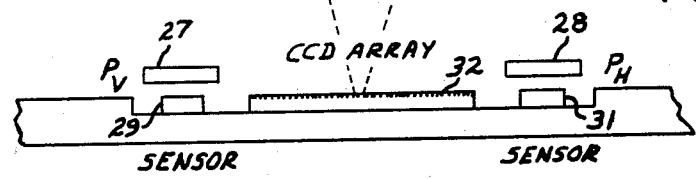
FIG. 3 contains a schematic depicting the sensor elements in the detector system.

Video systems, typically a camera coupled to a display, are frequently used to supplement or supplant the human senses. This is particularly true in weapons systems, where the magnification and electronic processing speeds easily outperform their human counterparts.

In the normal course of comparing such video systems, it is necessary to quantitatively evaluate certain performance characteristics, singly and in conjunction with human operators. The subject invention discloses an apparatus for quantitatively ascertaining the pattern detection thresholds, where the thresholds are functionally related to the contrast and spatial frequencies of the test patterns, while the background luminance is fixed at constant and uniform level.

Though the above-noted copending application addresses a similar analysis technique, it is fundamentally constrained to symmetric image patterns. In contrast, the present invention fully encompasses both symmetric and nonsymmetric patterns. Furthermore, this invention contemplates and surmounts the practical problem of drift, an inherent characteristic of luminous energy sources. Objectionable levels of drift are detected and suppressed by a closed loop control, a functional element clearly absent from the other invention.

Another distinct structural element lacking in the art and the above-noted copending application is the contrast measuring device. As embodied herein, the apparatus encompasses a charge coupled device (CCD) placed transverse to the longitudinal axis of the bar pattern coupled to level sensing electronic circuitry.

Directing attention to FIG. 1 now, there appears in the figure one embodiment of the invention. The apparatus generally comprises an enclosure, 1, with internal optical elements and peripheral luminous energy sources and sensors. At sealed opening 2 of the enclosure is video sensor 3, the device undergoing evaluation, either alone or in conjunction with a human observer. Another opening, 4, holds an easily interchanged transparency type target 6 which selectively obstructs the free entry of light from luminance integrating sphere 7. A typical target pattern appears schematically in FIG. 2. This pattern is a periodic or symmetrical one, although nonperiodic or nonsymmetrical patterns may be used also. Orthogonal to the latter opening, and axially aligned with video sensor 3, is another access into enclosure 1, a translucent window, 8, with neutral density filter 9 for altering the composition of light entering from luminance integrating sphere 11. And finally, opposite, and at the image plane of target 6, is detector system 12, for both measuring the pattern contrast and closed loop monitoring of background luminance.

Unpolarized luminous energy sources 13 and 14 are substantially equal as to intensity and spectral composition, and are located within their respective luminance integrating spheres so as to project uniform intensity beams into enclosure 1 through neutral density filter 9 and the non-opaque areas of target 6.

Dashed lines 16 and 17 show that corresponding lenses 18 and 19 are selected and positioned to form images of target 6 and filter 9 at both the input to video sensor 3 and the sensing plane of detector system 12.

In the path of the uniform intensity luminous energy beam defined by line 17 is a horizontally oriented linear polarizer, 21. A similar polarizer, 22, though vertically oriented to be orthogonal to polarizer 21, intercepts the path of the luminous energy beam containing the target pattern. The two beams enter cube beam splitter 23, where they are split into substantially equal segments, interlaced, and transmitted along two orthogonal axes. Ideally, the two beams leaving splitter 23 are equal in background and pattern luminance. Note, however, that the luminance content of the bar target pattern retains its vertical polarization while the uniform beam contribution remains horizontally polarized.

Figure 4:
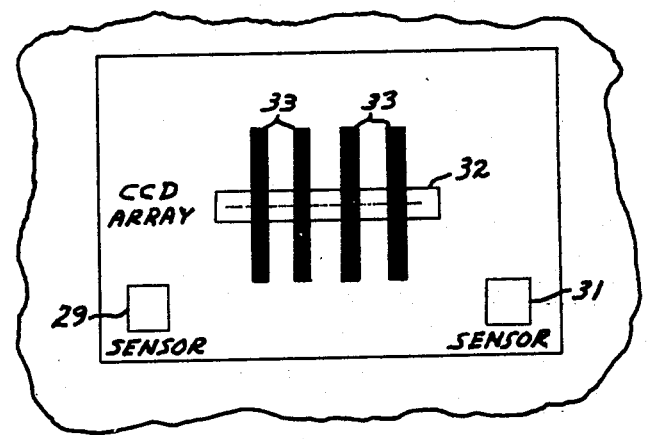
FIG. 4 schematically shows the sensor elements from the frontal aspect.

At this point it is worthwhile to describe the operations performed in detector system 12 and its relationship to luminous energy sources 13 and 14. For that purpose, mechanically linked rotatable linear polarizers 24 and 26 are presumed absent. Referring now to FIG. 3, the sensing elements of the detector system portrayed in FIG. 1 are magnified to show linear vertical and horizontal polarizers 27 and 28 situated optically preceeding their corresponding background luminance sensors, 29 and 31. The image plane, shown from another aspect in FIG. 4, shows the presence and relative location of CCD array 32. The sizes and locations of sensor 29, sensor 31 and CCD array 32 are selected and arranged so that the paths of the unpatterned background luminance of the beam transmitted from splitter 23 project through polarizers 27 and 28 to illuminate sensors 29 and 31. Accordingly, the opaque regions of the bar target pattern never obstruct those paths. CCD array 32 is otherwise, in that it lies transverse to and always intersects the image, 33, cast by the bar pattern. Undoubtedly one recognizes that the individual CCD array sensor elements must be measurably smaller than any single bar image.

Sensors 29 and 31 provide feedback signals to the intensity controls regulating the luminous energy radiated by sources 13 and 14. Polarizers 27 and 28 decouple the background luminance to insure that the drift adjustment error signals are routed to the correct source control.

Figure 5:
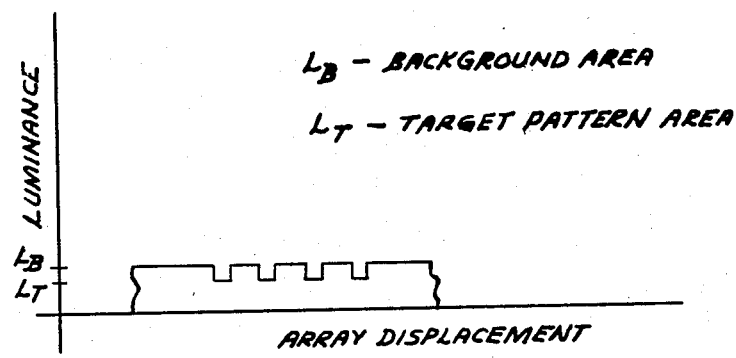
FIG. 5 contains a plot showing the relationship between position and luminance across the face of the charge coupled device array.

The CCD array in the detector system provides a quantifiable measure of the contrast between the bar target pattern and the background. When one recognizes that contrast is defined by a mathematical relationship between luminance levels in which $$C = \frac{L_{max} - L_{min}}{L_{max} + L_{min}},$$

and further recognizes the substantial linearity between the array signal amplitudes and input luminance, it becomes apparent that the electrical responses from the array carry the information necessary for calculating the contrast. In terms of the electrical signal plot in FIG. 5, contrast is:

$$C = \frac{L_B - L_T}{L_B + L_T}.$$

At one extreme, where both rotatable polarizers are horizontally oriented, the illuminance of the video sensor 3 is proportional to the transmittance coefficient of neutral density filter 9. No bar pattern is present. The other extreme occurs when both polarizers are vertically oriented. In this orientation, only the image from the target 6 is transmitted to the video sensor 3. The neutral density filter 9 is chosen to have a uniform transmittance coefficient equal to the average of the dark bar and bright bar transmittance coefficients of the target 6. With this condition, space-averaged illuminance at video sensor 3 and detector system 12 are identical at the two extremes of polarizer rotation zero contrast and full contrast. The terms "background luminance" and "space-averaged illuminance" as used herein are considered to be interchangeable.

Upon recalling the objectives sought from the apparatus, it becomes apparent that intermediate orientations of rotatable polarizers 24 and 26 must not change the background luminance as the bar pattern contrast is varied between the two above-noted extremes. The apparatus attains these objectives. Begin by considering Malus's law, a well recognized relationship defining the transmission of unpolarized luminous energy through crossed polarrizers:

$$L(\theta) = L(0) \cos^2\theta,$$

where $L(\theta)$ is luminance as a function of polarization misalignment angle $\theta$, and $L(0)$ is the luminance transmitted for a misalignment angle of $\theta = 0°$.

If $\theta = 0$ is defined to be the vertical axis, then the horizontal axis relationship, with respect to angle $\theta$, is:

$$L_H = L_H(0) \cos^2(\theta + 90°).$$

Recalling from trigonometric equivalence that $\cos^2(\theta + 90°) = \sin^2\theta$, the total background luminance eminating from one side of beam splitter 23 is:

$$L_B = \tfrac{1}{2}L_H(0) \sin^2\theta + \tfrac{1}{2}L_V(0)\cos^2\theta.$$

If the two levels of background luminance are, as originally defined, equal, then the equation simplifies to:

$$L_B = \tfrac{1}{2}L_{H/V}(0)[\sin^2\theta + \cos^2\theta], \; L_B = \tfrac{1}{2}L_{H/V}(0).$$

Note, the background luminance level is no longer related to misalignments of the polarization angle, remaining constant irrespective of the orientation set in rotatable polarizers 24 and 26.

Rotatable linear polarizer 24 is sufficiently large to encompass the whole of the beam directed toward video sensor 3. Rotatable linear polarizer 26 differs, in that its active area encompasses only the bar pattern region. The background luminance radiates without obstruction toward the individual polarizers 27 and 28, immediately preceeding the detector system. This structural distinction between rotatable polarizers avoids interaction between polarizers rotation and the regulation undertaken by the intensity control loops.

We claim:

1. An apparatus for detecting the minimum contrast resolution of a video sensor or the like, alone or in conjunction with a human observer, through generating patterns in a uniform luminance background and varying their contrast without altering the background luminance, comprising:
   a first source for generating a uniform and unpolarized beam of luminous energy which is adjustable as to intensity;
   a second source for generating a spatially patterned and unpolarized beam of luminous energy which is adjustable as to intensity and intersects said beam of said first source;
   a video sensor or the like displaced from, but optically aligned with, one of said first and second sources;
   a detector system displaced from, but optically aligned with, the other of said first and second sources;
   means for focusing the beam of said one of said sources so as to form an image thereof at an input of said video sensor and for focusing the beam of said other of said sources so as to form an image thereof at an image plane of said detector system;

a linear polarizer disposed in the path of each source beam, said polarizers being orthogonally oriented relative to each other;

means at the location of intersection of said beams of said first and second sources for receiving said source beams after their polarization, splitting the source beams into components substantially equal in background and pattern luminance, interlacing the split components, and transmitting respective beams of said interlaced components to said video sensor and said detector system;

a rotatable linear polarizer disposed in the path of each respective beam of said interlaced components being transmitted to said video sensor and said detector system, said rotatable polarizers being synchronized together in their orientations; and said detector system including a pair of spaced apart background luminance sensors positioned at the image plane of said detector system in unpatterned background regions of the spatially patterned image focused thereat for detecting source beam intensity and regulating the same to compensate for drift in the generation thereof, a pair of linear polarizers orthogonally oriented relative to each other, each polarizer positioned adjacent one of said background luminance sensors in the path of one beam of said interlaced components for decoupling the background luminance to insure that the drift compensation is made to the corresponding beam generating source, whereby a constant background luminance may be maintained, and a detector array positioned at the image plane of said detector system adjacent said pair of background luminance sensors but in contrasting regions of the spatially patterned image focused thereat for measuring luminance amplitude in said contrasting regions of said image for ascertaining minimum contrast resolution of the spatially patterned image also focused at said input of said video sensor.

2. The minimum contrast resolution detecting apparatus as recited in claim 1, wherein said detector array of said detector system is a CCD array in which the contrast between the pattern of said image and its background is represented by two electrical voltage levels in the output of the array, irrespective of the spatial frequency in the pattern.

* * * * *